United States Patent [19]

Inoue et al.

[11] Patent Number: 5,783,331
[45] Date of Patent: Jul. 21, 1998

[54] SECOND BATTERY COMPRISING A GEL POLYMER SOLID ELECTROLYTE AND A COPOLYMER OF VINYL PYRIDINE WITH A HYDROXYL-GROUP-CONTAINING (METH) ACRYLATE AS BINDER FOR THE NEGATIVE ELECTRODE

[75] Inventors: Tomohiro Inoue, Sagamihara; Toshiyuki Ohsawa, Kawasaki; Masahiro Taniuchi, Yokohama; Takayuki Kurohara; Koji Miura, both of Osaka, all of Japan

[73] Assignees: Ricoh Company, Ltd., Tokyo; Koei Chemical Company, Ltd., Osaka, both of Japan

[21] Appl. No.: 689,053

[22] Filed: Jul. 30, 1996

[30] Foreign Application Priority Data

Aug. 1, 1995 [JP] Japan .................................. 7-215361
Dec. 11, 1995 [JP] Japan .................................. 7-346114

[51] Int. Cl.$^6$ ................................................ H01M 4/62
[52] U.S. Cl. ........................... 429/217; 429/218; 429/190
[58] Field of Search .................................. 429/217, 218, 429/190

[56] References Cited

U.S. PATENT DOCUMENTS

| | | | |
|---|---|---|---|
| 4,363,856 | 12/1982 | Waterhouse | 429/143 |
| 4,430,397 | 2/1984 | Untereker | 429/191 |
| 5,262,255 | 11/1993 | Ito et al. | 429/217 |
| 5,340,672 | 8/1994 | Kubota et al. | 429/249 |
| 5,436,092 | 7/1995 | Ohtsuka et al. | |
| 5,443,927 | 8/1995 | Nakajima et al. | 429/215 |
| 5,514,496 | 5/1996 | Mishima et al. | 429/218 |
| 5,618,640 | 4/1997 | Idota et al. | 429/194 |

FOREIGN PATENT DOCUMENTS 7-268304  10/1995  Japan .

OTHER PUBLICATIONS

J..R. Owen al., "Composite Electrods", Solid State Ionics 5 (1981) 343–346. Reprinted in Fast Ionic Transport In Solids. Proceedings of th International Conference on Fast Ionic Transport in Solids, Gatlinburg, Tennessee, Bates et al., eds., North–Holland Publishing, May 1981.

*Primary Examiner*—Prince Willis, Jr.
*Assistant Examiner*—Carol Chaney
*Attorney, Agent, or Firm*—Oblon, Spivak, McClelland, Maier & Neustadt, P.C.

[57] ABSTRACT

A secondary battery includes a positive electrode comprising a positive active material; an electrolyte layer including a gel polymer solid electrolyte; and a carbon-based negative electrode capable of occluding and releasing lithium, which contains a binder including a resin composition of a copolymer of (a) a vinyl pyridine compound of formula (1).

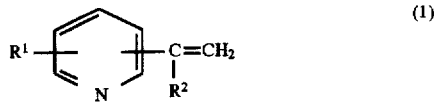

(1)

wherein $R^1$ is a hydrogen atom, an alkyl group having 1 to 3 carbon atoms, or a halogen atom, and $R^2$ is a hydrogen atom or an alkyl group having 1 to 3 carbon atoms, and (b) a hydroxyl-group-containing (meth)acrylate compound.

11 Claims, No Drawings

SECOND BATTERY COMPRISING A GEL POLYMER SOLID ELECTROLYTE AND A COPOLYMER OF VINYL PYRIDINE WITH A HYDROXYL-GROUP-CONTAINING (METH) ACRYLATE AS BINDER FOR THE NEGATIVE ELECTRODE

BACKGROUND OF THE INVENTION

1. Field of the Invention

The present invention relates to a secondary battery comprising a gel polymer solid electrolyte, with excellent battery characteristics, which can be fabricated by use of a binder for the negative electrode thereof, which binder exhibits excellent adhesion to the gel polymer solid electrolyte and is capable of improving the battery characteristics of the secondary battery.

2. Discussion of Background

Recent development of small, thin, and lightweight electronic appliances is remarkable, particularly in the field of office automation. For instance, small and lightweight electric appliances have been developed from desk-top type to lap-top type, and then to note-book type.

In addition, new small-sized electronic appliances such as electronic notebooks, and electronic still cameras are also now placed on the market. Furthermore, memory cards which are new small-sized memory media are now being developed in addition to the reduction in size of conventional hard disks and floppy disks.

In the midst of the recent trend of making the above-mentioned electronic appliances small-sized, thin and lightweight, a secondary battery with higher performance capable of supporting these appliances in terms of power supply is demanded.

Under such circumstances, a lithium secondary battery has been rapidly developed as a battery with high energy density, by which conventional lead storage batteries and nickel cadmium storage batteries will be eventually replaced.

As a positive active material for use in such a lithium secondary battery, transition metal oxides and transition metal chalcogenides, such as $TiS_2$, $MoS_2$, $CoO_2$, $V_2O_5$, $NbS_2$, $ZrS_2$, and $MnO_2$, are used and a number of secondary batteries using inorganic materials as active materials have been studied. Furthermore, a composite electrode comprising a conducting polymer and an inorganic active material is proposed, for instance, in Japanese Laid-Open Patent Application 63-102162.

When metal lithium is employed as a negative active material, high electromotive force can be obtained, so that a lightweight and high density battery can be easily fabricated. However, a negative electrode comprising metal lithium as a negative active material has the shortcoming that dendrites which have adverse effects on the battery, such as decomposing an electrolytic solution in the battery, are caused to grow therein during the course of repeated charging and discharging cycles. When such dendrites grow and reach the positive electrode, internal short-circuits take place in the battery.

When a lithium alloy is employed as the negative active material, the difficulties caused by the above-mentioned problems can be lessened. However, a secondary battery with satisfactory capacity cannot be obtained when a lithium alloy is employed as the negative active material for the negative electrode thereof.

Under such circumstances, it has been proposed to use, as the negative active material, carbon materials which are capable of occluding and releasing lithium and have high safety, and various studies have been made on such carbon materials.

For example, in Japanese Laid-Open Patent Application 2-66856, use is proposed of a conducting carbon material prepared by sintering furfuryl resin at 1100° C. as a negative active material.

Furthermore, Japanese Laid-Open Patent Application 61-277515 discloses the use of a conducting carbon material obtained by subjecting an aromatic polyamide to thermal treatment at 2000° C. or more under an inert atmosphere.

Japanese Laid-Open Patent Application 4-115457 discloses the use as a negative active material of a graphite material obtained by subjecting easily-graphitizable spherical carbon particles to graphitization.

Furthermore, Japanese Laid-Open Patent Application 61-77275 discloses a secondary battery using an electrode which comprises an insulating or semi-conductive carbon material with a polyacene structure, obtained by subjecting a phenol polymer to thermal treatment.

As an electrolyte for use in secondary battery, there have been employed various polymer solid electrolytes which contain no liquids and therefore are free from the problem of liquid leakage.

Recently gel polymer solid electrolytes with sufficient ionic conductivity and solid strength for use in practice are attracting attention.

Generally, in an electrode comprising a carbon material, the adhesion between a collector and an active material layer coated thereon is so weak that such electrodes have the problems that cracks are formed in the electrode, or the coated active material layer is peeled off the collector, during the production of a battery using such an electrode, or while the battery is in use in practice. In order to solve such problems, various binders for use in negative electrodes have been studied.

For instance, particular resins comprising polyvinylidene fluoride as an effective component have been proposed as such binders as disclosed in Japanese Laid-Open Patent Applications 4-249860, 4-363865, 5-190178, 6-11823 and 6-223833; copolymers with several functions imparted thereto as disclosed in Japanese Laid-Open Applications 4-294060 and 7-37619; mixtures of several different resins as disclosed in Japanese Laid-Open Patent Applications 6-52861, 6-203836 and 6-275279.

However, there has not yet been disclosed a binder which exhibits excellent adhesion to a gel polymer solid electrolyte and also is capable of improving battery characteristics.

SUMMARY OF THE INVENTION

It is therefore an object of the present invention to provide a secondary battery comprising a gel polymer solid electrolyte, with excellent battery characteristics, which can be fabricated by use of a binder for the negative electrode thereof, which binder exhibits excellent adhesion to the gel polymer solid electrolyte and is capable of improving the battery characteristics of the secondary battery.

This object of the present invention can be achieved by a secondary battery which comprises a positive electrode; an electrolyte layer comprising a gel polymer solid electrolyte; and a carbon-based negative electrode capable of occluding and releasing lithium, comprising a binder which comprises a resin composition comprising a copolymer of (a) a vinyl pyridine compound of formula (I),

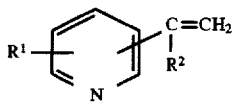 (1)

wherein $R^1$ is a hydrogen atom, an alkyl group having 1 to 3 carbon atoms or a halogen atom, and $R^2$ is a hydrogen atom or an alkyl group having 1 to 3 carbon atoms, and (b) a hydroxyl-group-containing (meth)acrylate compound.

The hydroxyl-group-containing (meth)acrylate compound may be a compound having formula (2):

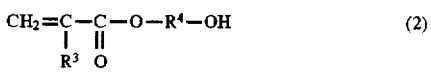 (2)

wherein $R^3$ is a hydrogen atom or methyl group, and $R^4$ is a hydrocarbon group having 2 to 4 carbon atoms.

In the above secondary battery, the binder may further comprise a cross-linking component. The cross-linking component may be, for example, a polyisocyanate compound.

The above-mentioned binder agent may further comprise an electrolyte.

DESCRIPTION OF THE PREFERRED EMBODIMENTS

The present invention is based on the discovery that in a secondary battery which comprises a positive electrode; an electrolyte layer comprising a gel polymer solid electrolyte; and a carbon-based negative electrode capable of occluding and releasing lithium, when there is employed for the negative electrode, a binder comprising a resin composition which comprises a copolymer of (a) a vinyl pyridine compound of formula (I),

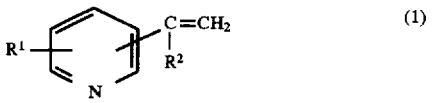 (1)

wherein $R^1$ is a hydrogen atom, an alkyl group having 1 to 3 carbon atoms, or a halogen atom, and $R^2$ is a hydrogen atom or an alkyl group having 1 to 3 carbon atoms, and (b) a hydroxyl-group-containing (meth)acrylate compound, when necessary with the addition of a cross-linking agent thereto, the binder agent exhibits excellent adhesion to the gel polymer solid electrolyte and is capable of improving the battery characteristics of the secondary battery.

Specific examples of the alkyl group represented by $R^1$ or $R^2$ in the above-mentioned formula (1) are methyl group, ethyl group, and propyl group.

The resin composition for the binder in the present invention is prepared by curing the above-mentioned copolymer of the vinyl pyridine compound of formula (1) and the hydroxyl-group-containing (meth)acrylate compound, when necessary, with the addition of a cross-linking agent thereto, with the application of heat or by radiation cure.

The thus prepared resin composition has excellent resistance to electrolyte solutions and does not have any adverse effects on the battery characteristics, and has excellent compatibility with gels, and therefore is suitable as a binder for the negative electrode which is used in combination with a gel polymer solid electrolyte.

A preferable example of the hydroxyl-group-containing (meth)acrylate compound for use in the present invention is a compound represented by formula (2):

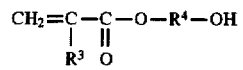 (2)

wherein $R^3$ is a hydrogen atom or methyl group, and $R^4$ is a hydrocarbon group having 2 to 4 carbon atoms.

It is preferable that the copolymerization ratio of the previously mentioned vinyl pyridine compound of formula (1) to the hydroxyl-group-containing (meth)acrylate compound be in the range of 1:5 to 5:1, more preferably in the range of 1:4 to 1:1.

When a cross-linking agent is added to the above components for the copolymerization, it is preferable that the amount of the cross-linking agent be in the range of 5 to 20 parts by weight to 100 parts by weight of the hydroxyl-group-containing (meth)acrylate compound.

In the preparation of the copolymer of the vinyl pyridine compound of formula (1) and the hydroxyl-group-containing (meth)acrylate compound, any other additional copolymerization component may be added thereto as long as the additional copolymerization component has no adverse effects on the adhesiveness of the copolymer to the gel polymer solid electrolyte and also on the battery characteristics.

Specific examples of the vinylpyridine compound for use in the present invention are vinylpyridines such as 2-vinylpyridine, 3-vinylpyridine and 4-vinylpyridine; and alkyl-vinylpyridines such as 2-methyl-5-vinylpyridine, 2-methyl-6-vinylpyridine and 5-methyl-2-vinylpyridine.

Specific examples of the hydroxyl-group-containing (meth)acrylate compound are 2-hydroxyethylacrylate, 2-hydroxyethylmethacrylate, 2-hydroxypropylacrylate, 2-hydroxypropylmethacrylate, 2-hydroxybutylmethacrylate, 3-hydroxybutylmethacrylate, and 4-hydroxybutylmethacrylate.

Specific examples of polyisocyanate compound serving as the previously mentioned cross-linking agent are 2,4-tolylene diisocyanate, 2,6-tolylene diisocyanate, hexamethylene diisocyanate, isophorone diisocyanate, and xylene diisocyanate.

When the above polyisocyanate compounds are used as one-part type binders, various block diisocyanates made from the above polyisocyanate compounds can be employed.

As the binder for the negative electrode in the present invention, the binder prepared by adding the cross-linking component to the above-mentioned copolymer is preferable since the adhesiveness thereof in the course of repeated charging and discharging cycles can be improved.

Furthermore, when the hydroxyl-group-containing (meth) acrylate compound is the previously mentioned compound represented by formula (2) and the cross-linking component is the previously mentioned polyisocyanate compound, there can be obtained a binder for the negative electrode, which satisfies the object of the present invention.

Furthermore, it is preferable that an electrolyte be additionally contained in the resin composition when preparing the binder for the negative electrode.

Examples of such an electrolyte for use in the present invention are $LiBr$, $LiBF_4$, $LiCF_3SO_3$ and $LiPF_6$.

As a binder for the positive electrode in the present invention, there can be employed conventional binder agents such as polytetrafluoroethylene, polyethylene, nitrile rubber, polybutadiene, butyl rubber, polystyrene, styrene/butadiene rubber, nitrocellulose, cyanoethyl cellulose, polyacrylonitrile, polyvinyl fluoride, polyvinylidene fluoride, polychloroprene, and polyvinyl pyridine. These binder agents can be employed alone or in combination.

It is preferable that the resistance to electrolytic solutions of these binders be enhanced by copolymerizing the above-mentioned binders. Of the above-mentioned binders, polyvinylidene fluoride is most suitable for use in the present invention. This is because polyvinylidene fluoride is stable at relatively high temperatures and soluble in solvents, and can be easily made into a uniform coating film.

It is preferable that the amount of the binder for each of the positive electrode and the negative electrode be in the range of 1 to 20 parts by weight to 100 parts by weight of the respective active materials for the positive and negative electrodes.

The binder for the negative electrode in the present invention can exhibit excellent adhesiveness to the gel polymer solid electrolyte layer even when used in a small amount, for example, 1 to 10 parts by weight to 100 parts by weight of the negative active material for the negative electrode.

The binders for the positive and negative electrodes are respectively used by mixing the respective binder and a positive active material or a negative active material in a solvent and dispersing the same and coating the respective dispersions on the respective collectors, and drying the same.

The structure of the secondary battery of the present invention will now be explained.

As the positive active material for use in the secondary battery of the present invention, for instance, the following materials can be employed: transition metal oxides such as $V_2O_5$, $MnO_2$ and $CoO_2$; transition metal chalcogen compounds such as $TiS_2$, $MoS_2$, and $Co_2S_6$; and composite materials composed of transition metal chalcogen compounds or oxides and Li, for example, Li composite oxides such as $LiMnO_2$, $LiMn_2O_4$, and $LiCoO_2$; linear graphite compounds which are organic thermal polymers; carbon fluoride; graphite; and conducting polymers with an electroconductivity of $10^{-2}$ S/cm or more.

Specific examples of such conducting polymers are polymers such as polyaniline, polypyrrole, polyazulene, polyphenylene, polyacetylene, polyacene, polyphthalocyanine, poly-3-methylthiophene, polypyridine, polydiphenylbenzidine, and derivatives thereof.

It is preferable to employ conducting polymers which exhibit excellent cycle characteristics to 100% discharging and are more resistant to overdischarge than inorganic materials. Furthermore, since such conducting polymers are plastic in terms of molding and workability, unconventional characteristics thereof may be utilized when used as the positive active material in the present invention.

Although the conducting polymers have the above-mentioned advantages over other materials, a secondary battery provided with a positive electrode comprising a positive active material made of a conducting polymer has the problems that the density of the active material is so small that the volume energy density thereof is low; a sufficient amount of an electrolyte for carrying out an electrode reaction is required in an electrolytic liquid; the changes in the resistance of the electrolytic liquid are great because of large changes in the concentration of the electrolytic liquid in the course of the charging and discharging reactions, so that an extremely large amount of electrolytic liquid is required to carry out smooth charging and discharging reactions.

In view of the above-mentioned problems, the secondary battery provided with a positive electrode comprising a positive active material made of a conducting polymer is not suitable for improvement of the energy density.

Under such circumstances, it is conceivable to use in the positive electrode the previously mentioned inorganic chalcogenide compounds or inorganic oxides as positive active materials having high volume energy density. However, these compounds, when used as positive active materials, have the problems that the diffusion rate of the cations thereof in the positive electrode during the electrode reaction accompanied by the charging and discharging is so small that quick charging and discharging are difficult to perform, and that the reversibility thereof is poor and the cycle life thereof is shortened by overcharge.

Furthermore, such inorganic materials are difficult to mold as they are and therefore are usually subjected to pressure molding by use of, for instance, tetrafluoroethylene resin powder as a binder agent. In this case, however, the mechanical strength of the positive electrode is insufficient for use in practice; and when lithium ions are excessively built up in the electrode by overdischarge, the crystalline structure of such an inorganic compound is destroyed. Once such destruction takes place, the secondary battery cannot be used any longer.

In order to avoid the above-mentioned problems, it is conceivable to use an organic composite active material and an inorganic composite active material. In such a case, when a polymeric active material is used, it is required that such a polymeric active material exhibit high electroconductivity by electrochemical doping, and an electroconductivity of $10^{-2}$ S/cm or more as the material for the positive electrode. Furthermore, it is required that such a polymeric active material exhibit high ionic conductivity in terms of ionic dispersion performance. Such polymeric materials have not only current collecting function because of the high electroconductivity thereof, but also binding function as polymers, and also the function as active materials.

Conducting polymers are made electrically insulated at a potential on a base side, so that even when the composite positive electrode is in an overdischarge state, since the conducting polymer is made insulated, lithium ions are prevented from accumulating in an amount more than necessary in the inorganic active material contained within the composite positive electrode, whereby the structure of the inorganic active material is prevented from being destroyed. As a result, the composite positive electrode constitutes an electrode which is substantially resistant to overdischarge.

The conducting polymers for use in the above-mentioned composite positive electrode are required to have the following properties of (1) having the function of an active material; (2) being insoluble in any electrolytic liquid; (3) being capable of binding polymers; and (4) exhibiting electroconductivity.

Thus, the conducting polymers are capable of serving as a binder for fixing inorganic active materials. In this case, such an inorganic active material is covered in its entirety with such a conducting polymer. As a result, the peripheral surface of the inorganic active material becomes electroconductive.

Examples of such a conducting polymer are redox active materials such as polyacetylene, polypyrrole, polythiophene, polyaniline and polydiphenylbenzidine. In particular, nitrogen-containing compounds remarkably exhibit the above-mentioned effects.

Such conducting polymers for use in the positive electrode are required to have not only the electro-conductive property, but also high ionic conductivity in the ionic diffusion. Of the above-mentioned conducting polymers, polypyrrole, polyaniline and copolymers of the two are preferable in view of the advantages thereof that the electric capacity per unit weight is relatively large, and can perform relatively stable charging and discharging in non-aqueous electrolytic liquids in general use. Of the above-mentioned preferable conducting polymers, polyaniline is most preferable.

It is preferable that the inorganic active materials for use in the positive composite electrode have excellent voltage plateau. Specific examples of such inorganic active materials are oxides of transition metals such as V, Co, Mn and Ni; and composite oxides composed of the above-mentioned transition metals and alkali metals.

When the electrode potential which is required to be stable to an electrolytic liquid, voltage plateau and energy density are taken into consideration, crystalline vanadium oxides are preferable. Of crystalline vanadium oxides, vanadium pentoxide is most preferable since the voltage plateau portion of the discharge curve of crystalline vanadium pentoxide is located relatively near the electrode potential at the time of the occlusion and releasing of anions of the above-mentioned conducting polymers.

In the battery of the present invention, as active materials for the negative electrode, there can be employed graphite, and sintered pitch coke, synthetic polymers and natural polymers.

In the present invention, the following are preferably employed:

(1) Insulating or semi-conductive carbons which can be obtained by sintering any of synthetic polymers such as polymers made from phenol, and polyimide, and natural polymers in a reducing atmosphere at a temperature of 400° C. to 800° C.;

(2) Electroconductive carbons which can be obtained by sintering any of coal, pitch, synthetic polymers, and natural polymers in a reducing atmosphere at a temperature of 800° C. to 1300° C.; and (3) Carbon materials which can be obtained by sintering any of coke, pitch, synthetic polymers, and natural polymers in a reducing atmosphere at a temperature of 2000° C. or more; and graphite carbon materials such as natural graphite.

Of the above-mentioned carbon materials (1) to (3), the carbon materials (3) are preferable. In the carbon materials (3), carbon materials obtained by sintering mesophase pitch or coke in a reducing atmosphere at a temperature of 2500° C. or more, and natural graphite are most preferable, since they exhibit excellent voltage plateau, and preferable electrode characteristics.

In the present invention, a composite negative electrode composed of natural graphite and a carbon material obtained by sintering coke in a reducing atmosphere at a temperature of 2500° C. or more is preferably employed.

Natural graphite has preferable characteristics with respect to potential plateau and current characteristics, but has the problem of decomposing propylene carbonate which is in general use as a solvent for electrolytes employed in conventional non-aqueous secondary batteries.

The carbon material obtained by sintering coke in a reducing atmosphere at a temperature of 2500° C. or more does not have the above-mentioned problem and therefore is easy with respect to the choice of an electrolytic solution to be used in combination therewith.

In contrast to this, by use of a composite negative electrode composed of natural graphite and the carbon material obtained by sintering coke in a reducing atmosphere at a temperature of 2500° C. or more, as an active material for a negative electrode, there can be fabricated a negative electrode which has the advantages possessed by the natural graphite with respect to the potential plateau and current characteristics, and does not decompose any electrolytic liquid.

A sheet-shaped carbon material can be prepared by subjecting a carbon material and a binder to a wet paper making process; or by a coating method using a coating material composed of a carbon material and a binder mixed with an appropriate solvent.

The electrodes can be fabricated by coating the above prepared sheet-shaped carbon material on an appropriate collector, or causing the sheet-shaped carbon-material to adhere to the collector with or without application of pressure thereto.

Examples of the material for the current collector for the previously mentioned positive and negative electrodes for use in the present invention are a metal sheet, metallic foil, metal net, punching metal, expand metal, made of stainless steel, gold, platinum, nickel, aluminum, molybdenum, titanium or copper; and a net or unwoven fabric made of metal plating fibers, metal-deposited wires, or metal-containing synthetic fibers, comprising any of the above-mentioned metals. Of these materials, aluminum and stainless steel are particularly suitable for the current collector in view of electro-conductivity, chemical stability, and electrochemical stability, cost, and workability. Of these materials, aluminum is furthermore preferable in view of the lightness in weight and electrochemical stability thereof.

It is preferable that the surface of the current collector for the positive electrode and that for the negative electrode for use in the present invention be roughened. This is because by roughening the surface of the current collector, the contact area thereof with the active material layer can be increased, and the close contact between the active material layer and the current collector can be improved, whereby the impedance of the battery can be decreased.

Furthermore, in the fabrication of the electrodes by use of a coating liquid, the close contact between the active material and the current collector can be significantly improved by subjecting the surface of the current collector to roughening treatment.

The surface of the current collector can be roughened by abrasion by use of an emery paper, blast treatment, or chemical or electrochemical etching. When aluminum is used for the current collector, etched aluminum is preferable, which is obtained by etching aluminum. Such etching is most preferable for aluminum since the surface of aluminum can be effectively roughened in the order of microns without substantially deforming aluminum and decreasing the strength of aluminum.

The gel polymer solid electrolyte for use in the present invention is prepared by solidifying an electrolytic solution composed of a polymerizable compound and a conventional electrolytic solution by polymerizing the polymerizable compound with the application of heat or light thereto. Therefore, the gel polymer solid electrolyte is a gel cross-linked material which contains an electrolytic solvent.

Examples of the above-mentioned polymerizable compound are acrylates such as methoxydiethylene glycol methacrylate, and methoxydiethylene glycol diacrylate.

Such a polymerizable compound is polymerized in an electrolytic solution by use of an initiator such as benzoyl peroxide, azobisisobutyronitrile, methyl benzoyl formate, or benzoin isopropyl ether.

Specific examples of the electrolyte for use in the present invention include $LiClO_4$, $LiAsF_6$, $LiPF_6$, $LiBF_4$, $LiBr$, $LiCF_3SO_3$, $LiN(CF_3SO_2)_2$, and $LiC(CF_3SO_2)_3$. The electrolyte for use in the present invention is not particularly limited to the above-mentioned electrolytes.

The concentration of the electrolyte is preferably in the range of 0.1 to 10 moles/l, although the concentration depends upon the kind of the electrodes, and electrolytic solution employed.

Examples of an electrolytic solvent which constitutes an electrolyte are ethers such as tetrahydrofuran, 2-methyltetrahydrofuran, 1,4-dioxane and dimethoxyethane; amides such as dimethylformamide and dimethylacetamide; nitriles such as acetonitrile and benzonitrile; sulfur compounds such as dimethyl sulfoxysulfolane; chain carbonates such as dimethyl carbonate, diethyl carbonate, methyl ethyl carbonate and methyl isopropyl carbonate; and cyclic carbonates such as ethylene carbonate, propylene carbonate and butylene carbonate. These solvents can be used alone or in combination.

A separator may be optionally employed in the secondary battery of the present invention. It is preferable that such a separator for use in the present invention exhibit low resistance to ion transfer in the electrolytic solution, and excellent solution retaining capability.

Specific examples of such a separator are a glass fiber filter; an unwoven fabric filter made of polyester, polytetrafluoroethylene, polyflon and polypropylene; and an unwoven fabric filter made of glass fiber and any of the above-mentioned polymer fabrics.

Other features of this invention will become apparent in the course of the following description of exemplary embodiments, which are given for illustration of the invention and are not intended to be limiting thereof.

EXAMPLE 1

[Fabrication of Negative Electrode]

One part by weight of a resin component which was composed of a copolymer obtained by copolymerizing 1mole of 4-vinylpyridine and 3 moles of 2-hydroxyethyl methacrylate and 1 part by weight of $LiClO_4$ were dissolved in 35 parts by weight of N-methylpyrrolidone.

To the above solution, 20 parts by weight of natural graphite serving as a negative active material was added. This mixture was dispersed in an inert atmosphere in a roll mill, whereby a coating liquid for fabrication of a negative electrode was prepared.

The thus prepared coating liquid was coated with a thickness of 20 μm on a copper foil by a wire bar, and was then dried at 130° C. for 20 minutes, whereby a negative electrode with a negative electrode layer having a thickness of 60 μm (45×75 mm) was fabricated.

The thus fabricated negative electrode was subjected to a bending test in which the negative electrode was completely folded up, with a 180° -bending, in such a manner that the coated negative electrode appeared on the outside, to see if there occurred the peeling of the coated negative electrode layer or cracking therein. The result is shown in TABLE 1.

[Fabrication of Positive Electrode]

3 parts by weight of polyvinylidene fluoride (PVDF) were dissolved in 60 parts by weight of N-methyl-pyrrolidone. To this solution, 50 parts by weight of $V_2O_5$ serving as a positive active material and 6 parts by weight of graphite serving as a conducting agent were added. This mixture was mixed and dispersed under an inert atmosphere in a homogenizer, whereby a coating liquid for the fabrication of a positive electrode was prepared.

The thus prepared coating liquid was coated on a SUS foil with a thickness of 20 μm by a wire bar, and was then dried at 100° C. for 15 minutes, whereby a positive electrode with a positive electrode layer having a thickness of 60 μm (45×75 mm) was fabricated.

[Preparation of Photopolymerizable Solution]

An electrolytic solution was prepared by mixing 20 parts by weight of $LiCF_3SO_3$ in 70 parts by weight of a mixed solvent composed of propylene carbonate/ethylene carbonate/dimethoxyethane (2/5/3 by volume ratio).

To the above prepared electrolytic solution, 12.8 parts by weight of polyoxyethylene acrylate, 0.2 parts by weight of trimethylolpropane acrylate, and 0.02 parts by weight of benzoin isopropyl ether were added, whereby a photopolymerizable solution was prepared.

[Fabrication of Secondary Battery No. 1]

The positive electrode layer and the negative electrode layer of the above fabricated positive electrode and negative electrode were soaked in the above prepared photopolymerizable solution, and then irradiated with the light of a high pressure mercury lamp, whereby the photopolymerizable solution in the respective electrode layers was solidified.

The positive electrode with the above prepared solidified positive electrode layer and the negative electrode with the above prepared solidified negative layer were superimposed in such a manner that the positive electrode layer came into contact with the negative electrode layer, and uniform pressure was applied to the superimposed positive electrode and negative electrode, and three sides thereof were thermally sealed, and the remaining one side thereof was then sealed under reduced pressure, whereby a secondary battery No. 1 of the present invention was fabricated.

[Charging and Discharging Tests]

The above fabricated secondary battery No. 1 of the present invention was subjected to the following charging and discharging tests:

The secondary battery No. 1 was charged with an electric current of 1.1 mA until the voltage of the battery reached 3.7 V by use of a commercially available charging and discharging test apparatus (Trademark "HJ-201B" made by Hokutodenko co., Ltd.), and was then discharged down to 2.5 V.

This charging and discharging cycle was repeated 500 times, whereby the initial discharge capacity (mAh) of the battery and the discharge capacity (mAh) after the 500th cycle were measured. The results are shown in TABLE 1.

EXAMPLE 2

The procedure for fabricating the secondary battery No. 1 in Example 1 was repeated except that in the fabrication of the negative electrode, one part by weight of the resin composition employed in Example 1 was replaced by one part by weight of a resin composition composed of 100 parts by weight of the copolymer prepared in Example 1 and 5 parts by weight of hexamethylene diisocyanate (Trademark "MEK oxime block BL3175" made by Sumitomo Bayer Urethane Co., Ltd.) serving as a cross-linking component, whereby a secondary battery No. 2 of the present invention was fabricated.

EXAMPLE 3

The procedure for fabricating the secondary battery No. 2 in Example 2 was repeated except that one part by weight of the resin component employed in the fabrication of the negative electrode in Example 2 was replaced by one part by weight of a resin component composed of (a) 100 parts by weight of a copolymer obtained by copolymerizing 1 mole of 4-vinylpyridine, 2 moles of 2-hydroxyethyl methacrylate, and 1 mole of 2-hydroxyethyl acrylate, and (b) 10 parts by weight of hexamethylene diisocyanate (Trademark "MEK oxime block BL3175" made by Sumitomo Bayer Urethane Co., Ltd.) serving as a crosslinking component, whereby a secondary battery No. 3 of the present invention was fabricated.

EXAMPLE 4

The procedure for fabricating the secondary battery No. 3 in Example 3 was repeated except that the amount of the hexamethylene diisocyanate (Trademark "MEK oxime block BL3175" made by Sumitomo Bayer Urethane Co., Ltd.) employed in Example 3 was increased to 19 parts by weight, whereby a secondary battery No. 4 of the present invention was fabricated.

EXAMPLE 5

The procedure for fabricating the secondary battery No. 2 in Example 2 was repeated except that the natural graphite serving as a negative active material employed in Example 2 was replaced by a carbon material obtained by sintering coke at 2800° C., whereby a secondary battery No. 5 of the present invention was fabricated.

EXAMPLE 6

The procedure for fabricating the secondary battery No. 5 in Example 5 was repeated except that in the preparation of the photopolymerizable solution in Example 5, the polyoxyethylene acrylate employed in Example 5 was replaced by ethyl diethylene glycol methacrylate, and that $LiCF_3SO_3$ serving as an electrolyte employed in Example 5 was replaced by $LiBF_4$, whereby a secondary battery No. 6 was fabricated.

Comparative Example 1

The procedure for fabricating the secondary battery No. 2 in Example 2 was repeated except that one part by weight of the resin composition serving as a binder in Example 2 was replaced by 10 parts by weight of polyvinylidene fluoride, whereby a comparative secondary battery No. 1 was fabricated.

Comparative Example 2

The procedure for fabricating the secondary battery No. 4 in Example 4 was repeated except that one part by weight of the resin composition serving as a binder in Example 4 was replaced by 5 parts by weight of polypropylene, whereby a comparative secondary battery No. 2 was fabricated.

TABLE 1

|  | Adhesive Properties | Initial Discharge Capacity (mAh) | Discharge Capacity after 500th cycle(mAh) |
| --- | --- | --- | --- |
| Ex. 1 | O | 61.5 | 50.7 |
| Ex. 2 | O | 60.2 | 56.5 |
| Ex. 3 | O | 60.9 | 54.7 |
| Ex. 4 | O | 62.4 | 60.6 |
| Ex. 5 | O | 56.0 | 53.8 |
| Ex. 6 | O | 58.5 | 51.4 |
| Comp. Ex. 1 | O | 60.6 | 17.1 |
| Comp. Ex. 2 | X | 48.6 | 2.5 |

Note:
In the above TABLE 1, mark "O" denotes that neither peeling nor cracking was observed in the negative electrode layer when folded up, and mark "X" denotes that both peeling and cracking were observed in the negative electrode layer when folded up.

What is claimed is:

1. A secondary battery comprising:

a positive electrode;

an electrolyte layer comprising a gel polymer solid electrolyte; and a carbon-based negative electrode capable of occluding and releasing lithium, comprising a binder which comprises a resin composition comprising a copolymer of (a) a vinyl pyridine compound of formula (1).

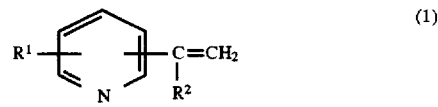

wherein $R^1$ is a hydrogen atom, an alkyl group having 1 to 3 carbon atoms or a halogen atom, and $R^2$ is a hydrogen atom or an alkyl group, having 1 to 3 carbon atoms, and (b) a hydroxyl-group-containing (meth)acrylate compound.

2. The secondary battery as claimed in claim 1, wherein said binder further comprises a cross-linking component.

3. The secondary battery as claimed in claim 2, wherein said cross-linking component is a polyisocyanate compound.

4. The secondary battery as claimed in claim 1, wherein said hydroxyl-group-containing (meth)acrylate compound is a compound having formula (2):

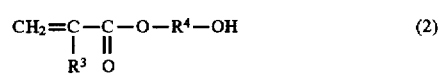

wherein $R^3$ is a hydrogen atom or methyl group, and $R^4$ is a hydrocarbon group having 2 to 4 carbon atoms.

5. The secondary battery as claimed in claim 1, wherein said binder further comprises an electrolyte.

6. The secondary battery as claimed in claim 2, wherein said binder further comprises an electrolyte.

7. The secondary battery as claimed in claim 3, wherein said binder further comprises an electrolyte.

8. The secondary battery as claimed in claim 1, wherein the ratio of (a):(b), by weight, is 1:5 to 5:1.

9. The secondary battery as claimed in claim 1, wherein the ratio of (a):(b), by weight, is 1:4 to 1:1.

10. The secondary battery as claimed in claim 2, wherein said crosslinking compound is present in an amount of 5 to 20 parts by weight per 100 parts by weight of (b).

11. The secondary battery as claimed in claim 1, wherein said binder is present in an amount of 1 to 20 parts by weight per 100 parts by weight of active materials.

* * * * *

UNITED STATES PATENT AND TRADEMARK OFFICE
CERTIFICATE OF CORRECTION

PATENT NO. : 5,783,331
DATED : July 21, 1998
INVENTOR(S) : Tomohiro INOUE, et al.

It is certified that error appears in the above-identified patent and that said Letters Patent is hereby corrected as shown below:

On the title page, Item [54], and Column 1, line 1, the Title, is incorrect. It should read:

--SECONDARY--

Signed and Sealed this

Twelfth Day of January, 1999

Attest:

Attesting Officer

*Acting Commissioner of Patents and Trademarks*

UNITED STATES PATENT AND TRADEMARK OFFICE
CERTIFICATE OF CORRECTION

PATENT NO. : 5,783,331
DATED: : July 21, 1998
INVENTOR(S) : Inoue et al

It is certified that error appears in the above-identified patent and that said Letters patent is hereby corrected as shown below:

Column 8, line 23, "electro-conductivity" shoud read

--electroconductivity--.

Column 9, line 32, "1mole" should read - - 1 mole--, line 59, "a" should read - - an - -.

Signed and Sealed this

Thirtieth Day of May, 2000

Attest:

Q. TODD DICKINSON

*Attesting Officer*  *Director of Patents and Trademarks*